Oct. 25, 1927.
W. UMBDENSTOCK
1,646,840
NUT CASTELLATING MACHINE
Filed Nov. 26, 1924
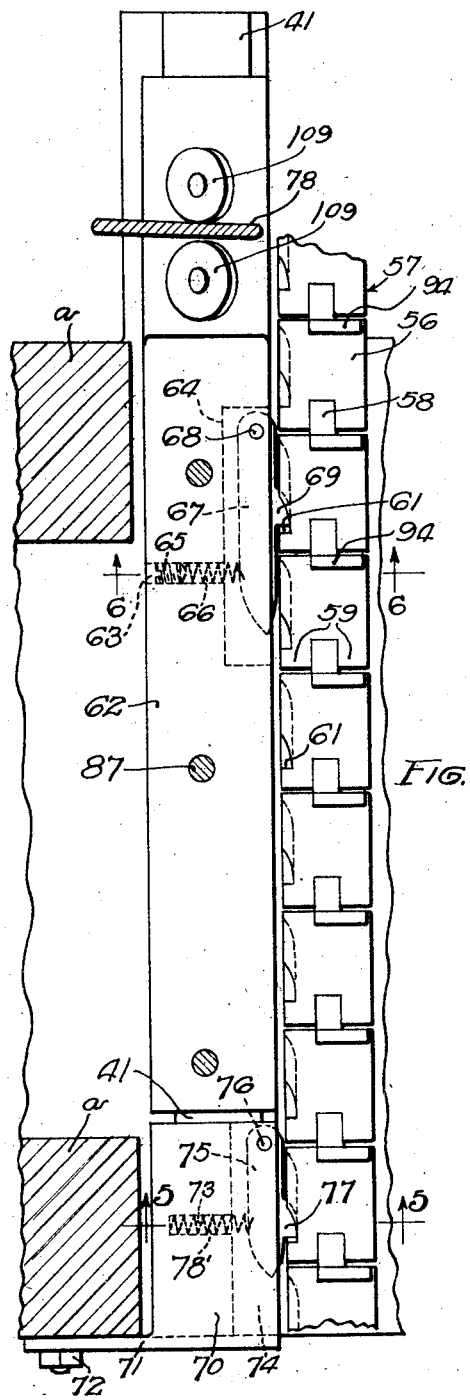
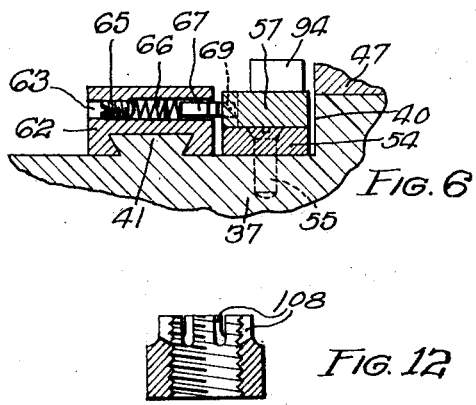
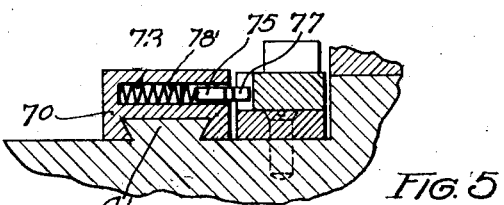
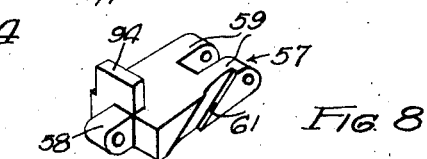
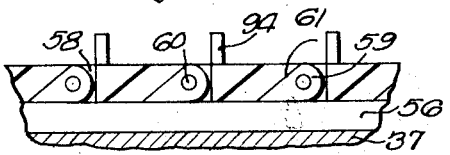
INVENTOR
WALTER UMBDENSTOCK
By Henry Mech
ATTY.

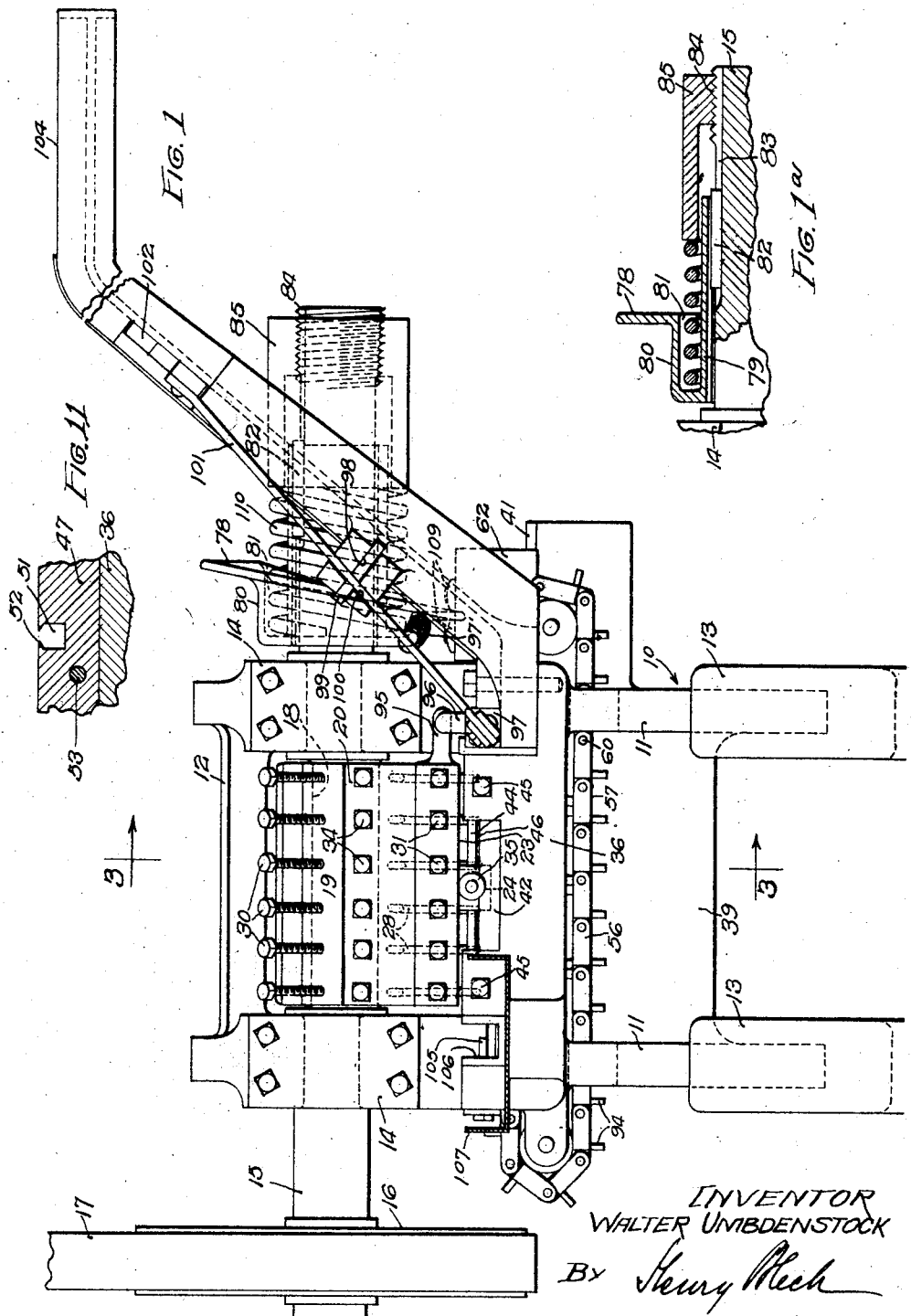

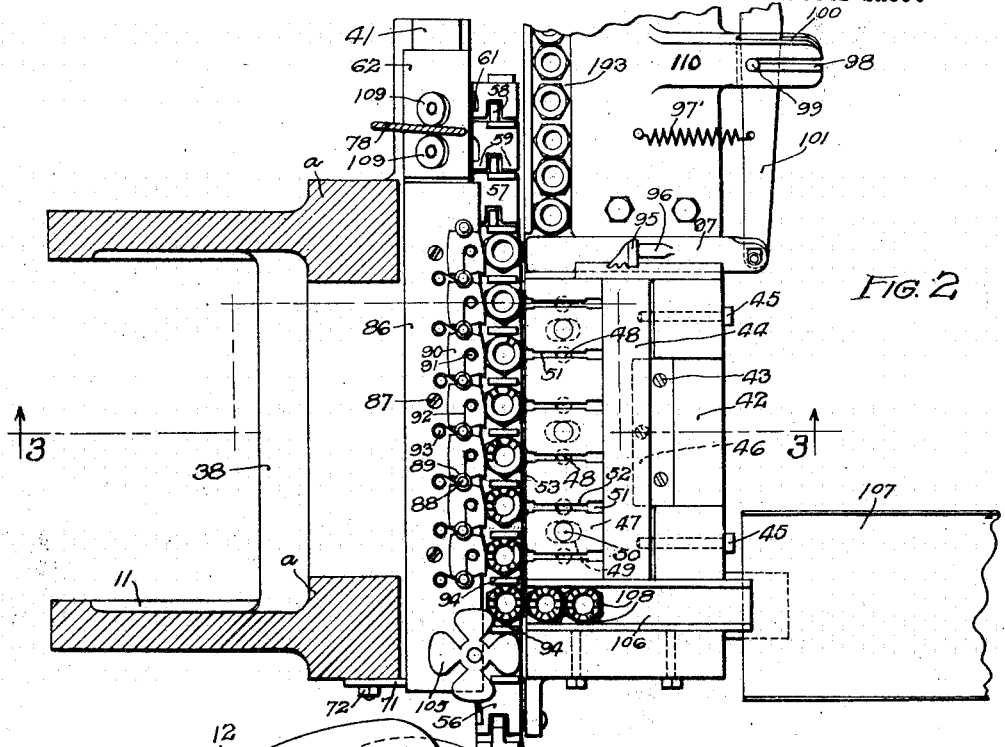

Oct. 25, 1927.
W. UMBDENSTOCK
1,646,840
NUT CASTELLATING MACHINE
Filed Nov. 26, 1924    4 Sheets-Sheet 4
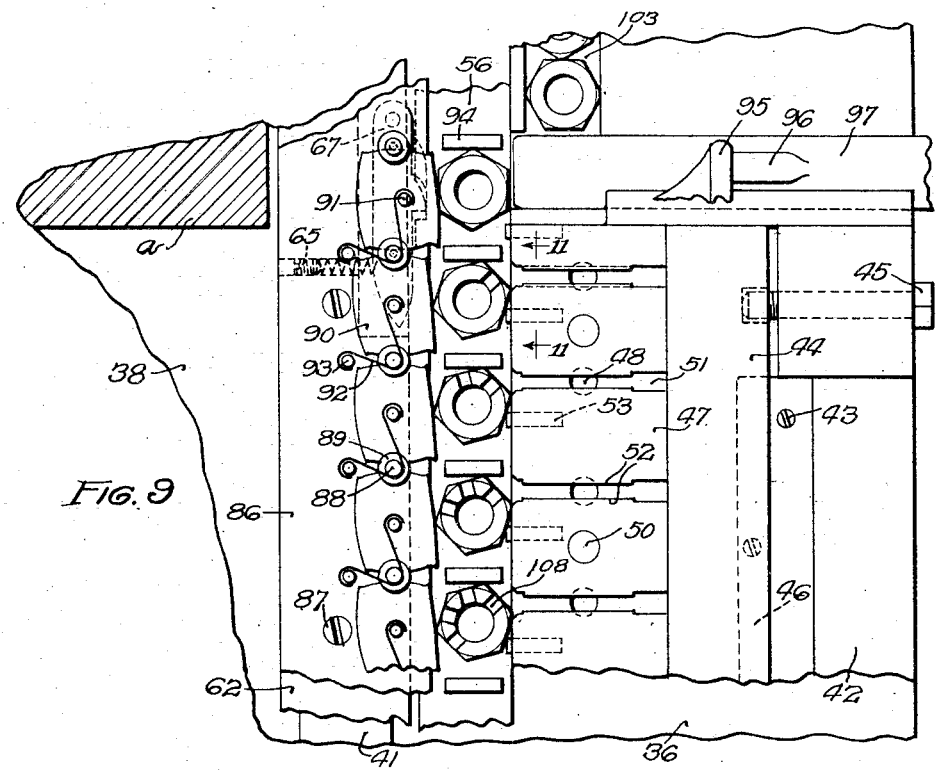
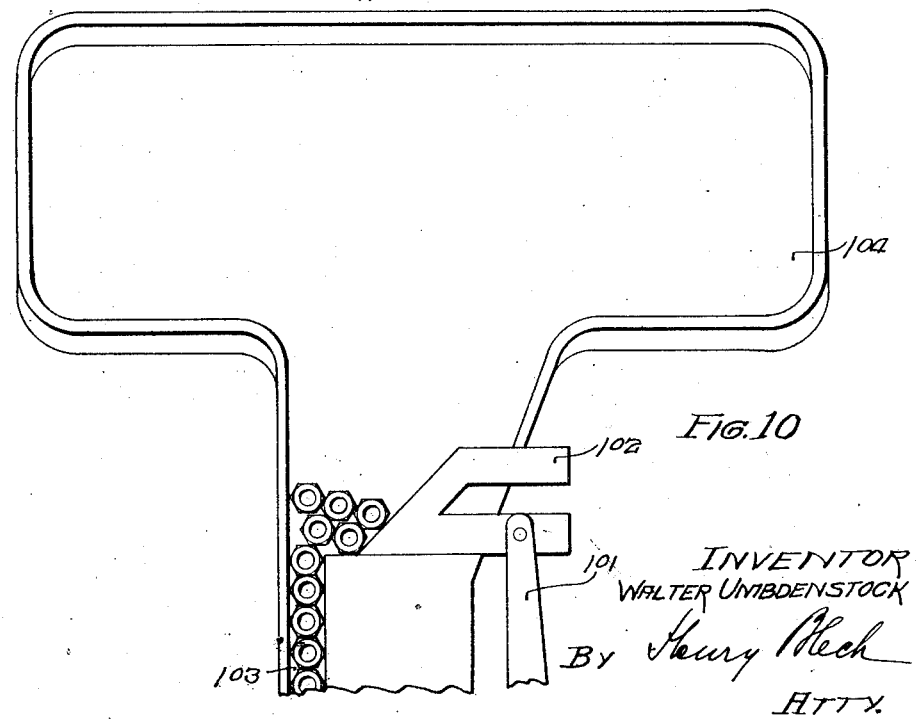
INVENTOR
WALTER UMBDENSTOCK
By Henry Rech
ATTY.

Patented Oct. 25, 1927.

1,646,840

UNITED STATES PATENT OFFICE.

WALTER UMBDENSTOCK, OF CHICAGO, ILLINOIS, ASSIGNOR TO FREDRIC GREER, OF CHICAGO, ILLINOIS.

NUT-CASTELLATING MACHINE.

Application filed November 26, 1924. Serial No. 752,302.

The invention relates to nut castellating machines of the type in which a series of nuts are moved through a predetermined path where the nuts are consecutively subjected to the action of a plurality of punches which cut into the wall of the nuts kerfs producing thereby equally spaced slots for the reception of cotter pins, whereby the nuts are locked on the bolts carrying the same.

It is an object of the invention to produce a machine of the type characterized which combines an unusual degree of efficiency, extraordinary speed, and consequently, large output, and reliability of operation of a high order.

It is a further object of the invention to produce a fool proof machine which insures satisfactory operation and which automatically discontinues punching of nuts in the event that jamming or irregularly feeding of nuts through the path assigned to them occurs.

It is a further object of the invention to guide the punches in a devious closed path so that they cut kerfs in the nut blank wall upon the nut blanks being arranged in proper position.

Another object aims at providing improved feeding and indexing means for the nut blanks, so that in the castellating operation always a new wall portion is presented to the punches.

Other objects embrace the removal of the slugs cut from the nut walls; the feeding of the nut blanks to the machine; and the positive removal of the castellated nuts from the machine.

The importance and many advantages of the machine forming the subject matter of this invention will be apparent from the following description and from the claims pointing out the novel features. In the accompanying drawing, a preferred form of the invention is illustrated disclosing in Fig. 1, a front elevational view of the machine.

Fig. 1ª is a fragmentary section of the shaft and associated parts,

Fig. 2 is a sectional plan view, the section being taken on line 2—2 of Fig. 3.

Fig. 3 is a sectional elevation, the section being taken on line 3—3 of Fig. 1 or 2, Fig. 4 is an enlarged fragmentary plan view showing a feed bar and the co-operating conveyer, Figs. 5 and 6 are detailed sections on the lines 5—5 and 6—6 of Fig. 4, Fig. 7 is a fragmentary elevational view of the conveyer, Fig. 8 is a perspective view of a conveyer link, Fig. 9 is a fragmentary plan view of a portion of the machine showing the die, conveyer and a plurality of holding plates, the nuts being shown in various positions which they assume during indexing.

Fig. 10 shows the upper end of a feeding chute for the feeding of the nuts,

Fig. 11 is an enlarged detail section of the die, and,

Fig. 12 is an enlarged section through a castellated nut.

Referring to the several views of the drawing the machine includes a frame generally designated by 10 and comprising side walls 11 which are connected by a brace 12. The side walls 11 are supported by a base 13 and are equipped with bearings 14 for the reception of a crank shaft 15 which at one end is provided with a pulley 16, around which a belt 17 is trained to impart rotation to the crank shaft 15. To the crank 18 of the shaft 15 is secured a ram 19 which is of a width substantially equal to the distance between the bearings 14 and which comprises a block 20 secured to the crank 18 by a cap 21 encompassing the crank 18 and secured to the block 20 by screws 22. The block 20 of the ram 19 is rotatable on the crank 18 and is provided with a horizontal lower face 23 to the free end of which is secured a cam plate 24 by screws 25.

The ram 19 throughout its width is provided with a slot 26 which is open at the lower face of the ram and which is of stepped formation to provide a deeper slot 27 in which is received a plurality of punches 28 received in a comb plate 29 having cut-out portions (not shown) in which the punches 28 are seated. The plate 29 is received in the slot 26. Set screws 30 bear on the upper end of the punches 28 and these set screws extend in oblique direction through the upper part of the ram while holding screws 34 extend in horizontal direction through the ram head and bear on the set screws 30 to lock them in adjusted position. The ram head 19 at the lower end is formed with horizontal bores 32 in which are introduced bolts 33 bearing on the punches 28. Said screws 34 engage the heads of bolt 33 and force the same against the punches 28 to retain them in functional position. The cam plate 24 is equipped with a handle 35 whereby the ram 19 may be swung around the crank shaft 15 if access is desired to the parts subjacent to the ram head. The frame 10 of the castellating machine is equipped with a bed 36 which comprises at the forward end a thicker portion 37 and thence passes into a thin plate portion 38. A rib 39 is cast integral with the bed plate 38 and with the side walls 11 of the frame 10 to enhance the rigidity of the frame and to make the machine more stable.

The bed plate 38 is in a plane lower than the top surface of the thick bed portion 37, whereby a shoulder 40 is formed. In alignment with the rib 39 the bed plate 38 is provided with a dove-tail 41 for a purpose hereafter to be further referred to. To the bed portion 37 a cam 42 is secured by a plurality of screws 43. The cam 42 as indicated in Fig. 2 is received in a recess formed in the bed 37. Adjacent to the cam 42 a thrust plate 44 is provided which is held in position by a pair of bolts 45 horizontally extended through the bed portion 37, and is equipped with a recess 46 at the lower side to receive the inner end of the cam 42. On the top surface of the bed portion 37 and abutting the thrust plate 44, a die generally designated by 47 is provided which is of rectangular form and comprises a single block. The die is provided with a plurality of vertical bores 48 which open into elongated holes 49 in the bed portion 37 and bolts 50 are introduced from below into the holes 49 and screwed into the bores 48 of the die 47 to secure the latter in place.

Attention is called to the fact that the elongated holes 49 permit shifting of the die as may become necessary after the die is worn in the course of operation. The die 47 is provided with six slots 51, which are in alignment with six punches 28 arranged in the ram 19, and as indicated in Fig. 11, the upper edges of the slots are slightly headed over as in 52 so that the entrance opening of the slots is of less width than the slot itself for a purpose which will hereafter be further pointed out.

A plurality of pins 53 protrude slightly from the die in alignment with the slots 51 and constitute abutments around which the nuts turn in their travel, as will be later described.

The die 47 terminates at the inner end flush with the shoulder 40. To the bed plate 38 a steel bar 54 is secured by screws 55 and constitutes a support for an endless conveyer 56. As indicated in Figs. 7 and 8, the endless conveyer is made up of a plurality of links 57 which at one end are provided with apertured lugs 58 and at the other end are bifurcated to provide prongs 59 between which is received the lug of the adjacent links. Pins 60 are introduced through the registering apertures of the prongs 59 to secure the links together. As indicated in Fig. 7, the inner side of the links 57 is provided with a recess which is formed to provide shoulders 61. At the base of lug 58 the link has an upstanding flange 94.

On the dove-tail 41 is slidably secured a feed bar 62 which as indicated in Figs. 4 and 6, is formed with a horizontal bore 63 leading into a recess 64 elongated terminating flush with the outer edge of the feed bar. A headless screw 65 is seated in the bore and forms an abutment for a spring 66 housed in said bore and pressing against a pawl 67 adapted to oscillate in a horizontal plane about a pivot pin 68. The pawl 67 has a nose 69 adapted to enter in a recess of an adjacent link 57 so that upon movement of the feed bar 62 toward the left as viewed in Fig. 4, the same entrains the conveyer and moves the same to the extent of the movement of the feed bar, as will be hereinafter further referred to.

On the dove-tail 41 and to the left side of the feed bar 62, a bar 70 is provided similar in shape to the feed bar 62 but provided at the free end with an arm 71 which is secured to a frame wall 11 by a screw 72. The bar 70 is also formed with a horizontal bore 73 which, as viewed in Fig. 5, opens into a longitudinal slot 74 conterminous with the bar 70 and in said slot a pawl 75 oscillates about a pivot pin 76 and enters with a nose 77 in a recess 61 of an adjacent pivot link. A spring 78' is housed in the bore 73 and engages with one end the inner edge of the bore 75. Inasmuch as the bar 70 is stationary by reason of its being secured to the frame of the machine, it will be clear that in the movement of the conveyer the same ratchets over the nose 77 but backward movement is prevented by reason of the fact that the shoulder of the recess 61 of the conveyer link engages the shoulder of the nose 77 of the pawl 75, so that the conveyer can only move in one direction.

Referring to Fig. 1, it will be seen that the protruding right end of the cam shaft 15 is provided with a cam disk 78 which comprises a sleeve 79 surrounding the cam shaft 15. At one end the sleeve is bent upon itself to provide a sleeve portion 80 parallel to the sleeve 79 but at a distance therefrom to provide an annular space 81, and the sleeve portion 80 at the free end is formed to provide the cam disk. The sleeve 79 is equipped with a key 82 which is received in a keyway 83 provided in the shaft 15 and terminating flush with the right end of said shaft which has threads 84 to receive a hollow nut 85. A spring 110 is seated in the annular space 81 of the cam disk and bears with the right end on the nut 85. To the adjacent end of the feed bar 62, a pair of rollers 109 are secured between which the flange of the cam disk 78 is received. Upon rotation of the crank shaft, the cam disk 78 will cause reciprocation of the feed bar 62 and movement of the feed bar toward the left as viewed in Figs. 1 and 4, will cause movement of the conveyer in one direction only so that the conveyer is intermittently moved a predetermined distance during each revolution of the shaft 15.

As indicated in Fig. 3 to the feed bar 62 is secured a plate 86 by a plurality of screws 87. Parallel to the longitudinal edge of the plate 86 a series of spaced pins 88 (Fig. 9) are provided which intermediate the ends have circular flanges 89. On the plate 86 are received between the pins 88 small substantially rectangular plates 90 with curved ends as appears in Fig. 9, and in the center of the plate a headed pin 91 is secured which receives the end of a helical spring 92 which is wound in several convolutions about the pin 88 and the other extremity is curled around a pin 93 secured behind the pin 88 to the plate 86. Thus it will be seen that the small plates 90 are forced under spring pressure against the nuts received on the conveyer links in the compartments formed by the upright flanges 94 of the links 57.

The ram block 19 is formed with a laterally extending arm 95 which bears on a lug 96 upstanding from a feed finger 97 adapted to reciprocate in the same direction as the ram block 19. The frame of the machine (Fig. 2) has an arm 110 provided with an open slot 98 to receive the vertical pivot pin 99. In addition, the arm 110 has a horizontal slot 100 open at the end of the arm in which is inserted a lever 101 through which the pivot pin 99 extends so that the lever 101 is a double arm lever to the upper end of which is articulated a feeding member 102 extending into a chute 103 connecting a pan 104 and the path in which the feed finger 97 reciprocates.

At the other end of the machine and in proper position with reference to the conveyer an ejector 105 is provided which comprises a member in the form of a Geneva cross, the wings of which are in the path of the flanges 94, so that upon movement of the conveyer, the ejector 105 is given a partial rotation, whereby the nut is forced into an ejector chute 106 leading to a receiving pan 107.

The operation of the device is as follows: Upon rotation of the crank shaft 15 the ram 19 is actuated and executes a movement in a closed devious path by reason of the engagement of the cam members 24 and 42. The nuts are fed in the space between the feed bar 62 and the die 47, and at the movement of the ram, the punches cut out slugs from the walls of the nut blanks, and these slugs are carried forward by the punches into the guide grooves 51 of the die where they are discharged through discharge bores 48. Upon the outward movement of the ram, the feed finger 97 is also forced outwardly allowing an adjacent nut blank to come in front of the feed finger 97 so that upon the return movement of the feed finger 97, caused by a spring 97', the nut carried in front thereof is forced into a compartment defined by adjacent flanges 94 of the conveyor links. During the outward movement of the ram, the cam disk 78 forces the feed bar 62 to the right as viewed in Fig. 1, and this movement of the feed bar is an idle one and merely serves to permit the nose 69 of the pawl 67 to enter into the recess of a link to the right. In the return movement of the bar 62, the conveyer will be moved to the extent of the distance of the centers of two links from one nut so that the various nut blanks on the conveyers are brought into registry with the next succeeding punch offering thereto a portion of the wall which has not been slotted by reason of the engagement of the nuts blanks with the ends of pins 53 which protrude from the die and in order to insure proper partial rotation of the nut blanks, the plates 90 are held under spring pressure in engagement with the nut blanks so that the nuts are in proper position when ready for castellation by the punches.

If for some reason or other the nuts become jammed and further feeding thereof would cause breakage of the machine, then the spring 110 will permit the cam disk 78 to move bodily on the cam shaft 15 as the disk is splined on the shaft so that the disk can move on the shaft but is locked for rotation therewith. It follows, therefore, that a safety device is provided for the machine which prevents breakage of any part in case of jamming of nuts.

Attention is also called to the fact that the feeding of the device is controlled from the crank shaft by reason of the fact that the feed member 102 forces nuts in a single tier into the chute 103 and the feed finger 97 controls the feeding of the nuts singly into the compartments formed by the link flanges 94.

It is also noteworthy that the ejector 105 constitutes a positive ejection of the castellated nuts in upright position facilitating thereby the inspection and removal of the castellated nuts.

The machine is of extremely simple construction and is especially efficient in function and operation. The nuts when castellated are formed with slots in the wall, the bottom of which at the outer end is higher than at the inner end, as shown in Fig. 12. The bottom of the slots 108 is inclined downwardly and inwardly so that when a cotter pin is inserted through the slot 108, it will be readily placed on the bottom of the opposite slot because the inner end is lower than the outer end thereof.

In the drawing, a preferred embodiment of the invention is illustrated, not, however, showing all the modifications and changes which may be made without departing from the spirit of the invention. I therefore do not limit myself to the details of construction and arrangement as shown but include all changes which fairly fall within the scope of the invention and claim my invention as broadly as the state of the art permits.

I claim:—

1. In a machine of the class described, means for supporting a nut blank in upright position, and means moving in a closed curvilinear path for castellating the nut blank, said means moving practically horizontally during the cutting stroke and returning above the blank to starting position.

2. In a machine of the class described, means for supporting a nut blank in upright position, a rotating element, and means pivotally secured to said element for cutting kerfs in the nut wall, said means moving practically horizontally during the cutting stroke and returning above the blank to starting position.

3. In a machine of the class described, means for supporting a nut blank in upright position, a rotating element, a punch movably secured to said element, and means for causing said punch to move relatively to said element at a predetermined position to thereby cut kerfs in the nut blank wall, said punch moving practically horizontally during the cutting stroke and returning above the blank to starting point.

4. In a machine of the class described, means for supporting nut blanks, a rotating element, means secured to said element for cutting kerfs in the nut wall, and reciprocating means actuated by said element for conveying the nut blanks through a path assigned thereto, said means moving practically horizontally during the cutting stroke and returning above the blank to starting position.

5. In a machine of the class described, means for supporting nut blanks, a rotating element, means secured to said element for cutting kerfs in the nut wall, and reciprocating means actuated by said element for conveying and indexing the nut blanks through a path assigned thereto, said means moving practically horizontally during the cutting stroke and returning above the blank to starting position.

6. In a machine of the class described, a crank shaft, a tool holder mounted on said crank shaft, a conveyer feeding nut blanks in upright position through a path, and means causing said tool holder to execute a curvilinear closed path to thereby cause the tool to slot the nut wall, the cutting stroke of said holder being practically horizontal and the return being above the nut.

7. In a machine of the class described, a nut blank holder supporting nuts in upright position, a tool and means for moving said tool in a curvilinear closed path to cut slots in the nut blank wall with a bottom inclined downwardly and inwardly, said tool moving practically horizontally during the cutting stroke and returning to starting point above the nut.

8. In a machine of the character described, means for conveying and indexing nut blanks, means for slotting the blanks, and means actuated by said slotting means for feeding the blanks singly to said conveying means.

9. In a machine of the character described, means for conveying and indexing nut blanks, means for slotting the blanks, and means actuated by said slotting means for placing the nuts singly on said conveying means.

10. In a machine of the character described, means for conveying and indexing nut blanks, means moving in a devious closed path for slotting the blanks, and reciprocating means actuated by said slotting means for feeding the blanks singly to said conveying means.

11. In a machine of the character described, means for slotting nut blanks, a chute for conducting nut blanks to said slotting means, and means controlled by said slotting means regulating the passage of the nut blanks in said chute.

12. In a machine of the character described, means for slotting nut blanks, a chute for conducting nut blanks to said slotting means, and means actuated by said slotting means for regulating the passage of the nut blanks in said chute.

13. In a machine of the character described, a conveyer carrying nut blanks, means for slotting the nut blanks, a chute for conducting nut blanks to said conveyer, and means actuated by said slotting means for regulating the passage of the nut blanks in said chute and for placing nut blanks on said conveyer.

14. In a machine of the character described, a conveyer carrying nut blanks, means for slotting the nut blanks, a chute for conducting nut blanks to said conveyer, and means actuated by said slotting means for regulating the passage of the nut blanks in said chute and for placing nut blanks on said conveyer, said regulating means becoming ineffective upon jamming of the nut blanks.

15. In a machine of the class described, a conveyer carrying nut blanks, means for slotting the nut blanks, a chute for conducting nut blanks to said conveyer, and a lever actuated by said slotting means for regulating the passage of the nut blanks in said chute.

16. In a machine of the class described, a conveyer carrying nut blanks, means for slotting the nut blanks, a chute for conducting nut blanks to said conveyer, and a lever actuated by said slotting means for regulating the passage of the nut blanks in said chute, said lever being adapted to be shifted out of position upon jamming of nut blanks.

In witness whereof I affix my signature.

WALTER UMBDENSTOCK.